Oct. 22, 1940.     O. VON GRUBER ET AL     2,219,275
TELESCOPE
Filed Sept. 13, 1938     2 Sheets-Sheet 1
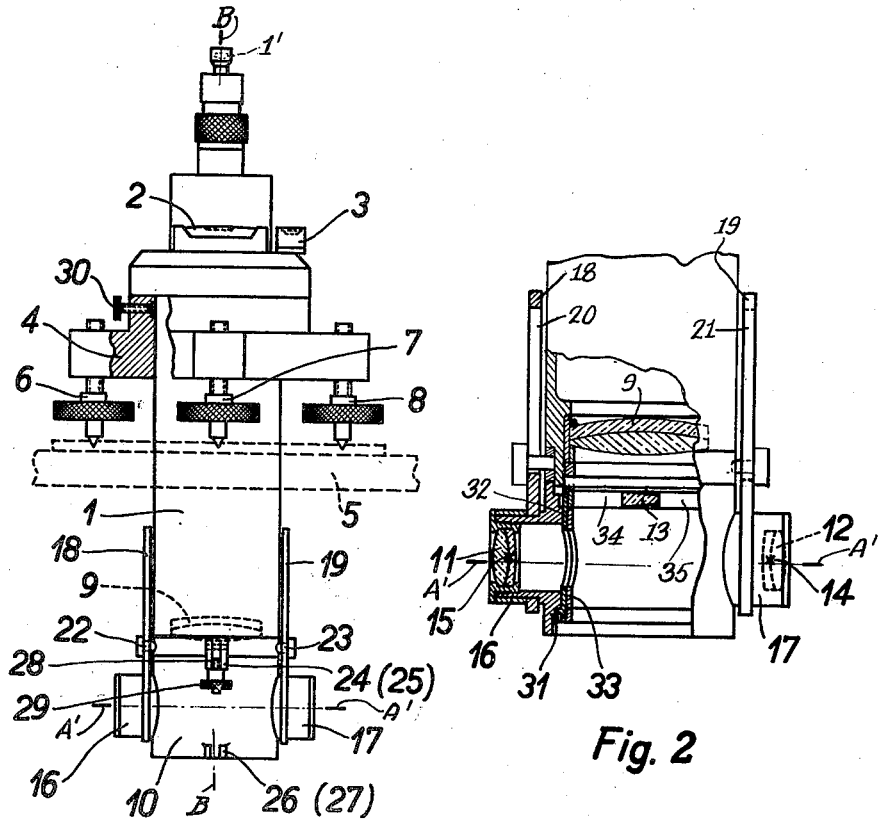
Fig. 1
Fig. 2
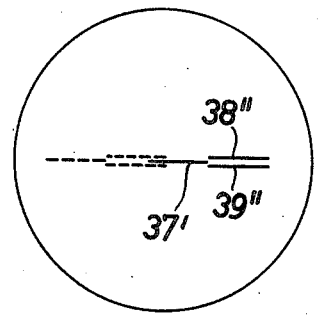
Fig. 7
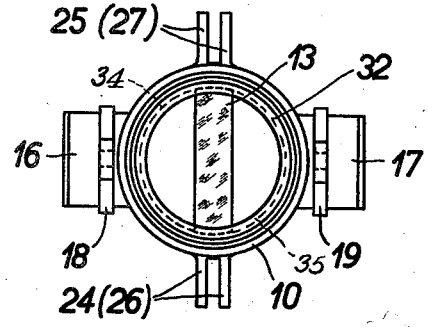
Fig. 3
Inventors:
Otto v. Gruber
Wilhelm Schneider

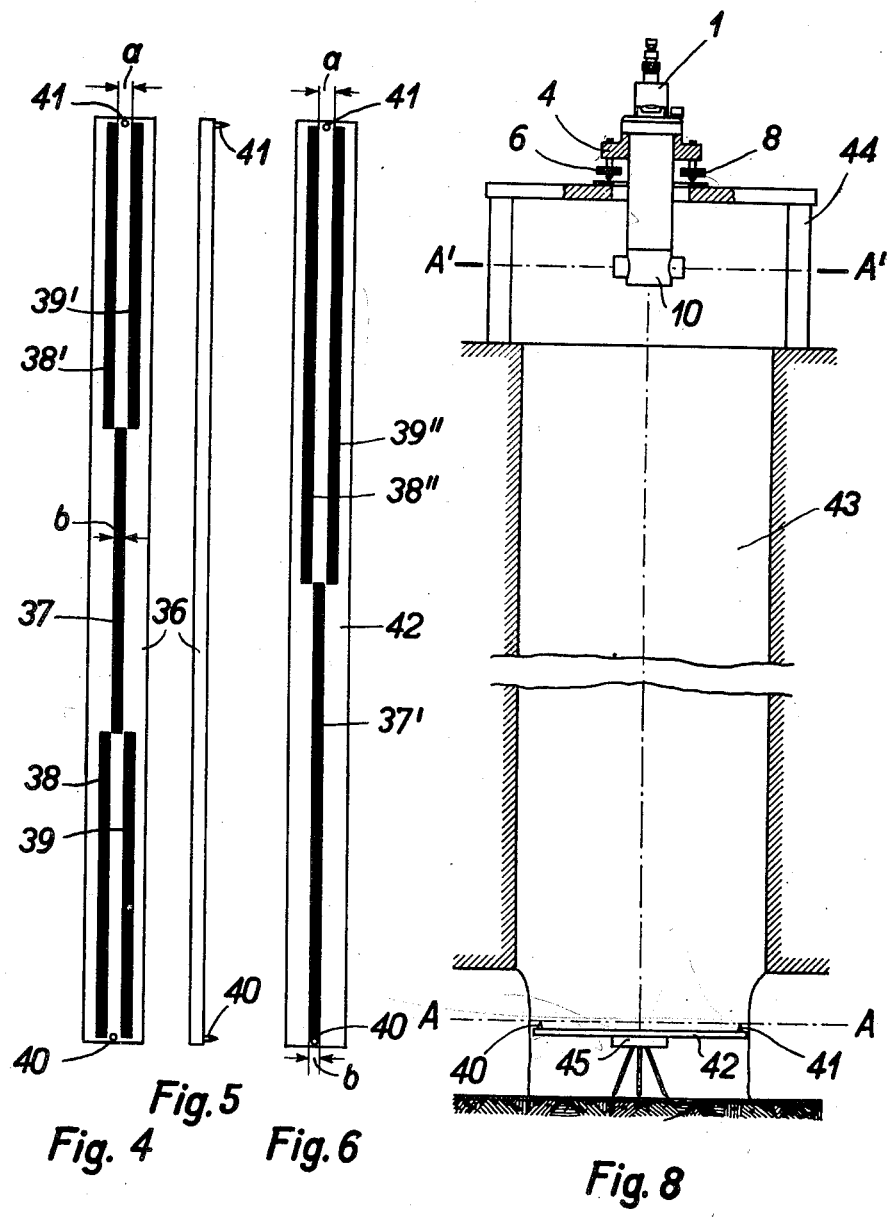

UNITED STATES PATENT OFFICE 2,219,275

TELESCOPE

Otto von Gruber and Wilhelm Schneider, Jena, Germany, assignors to the firm of Carl Zeiss, Jena, Germany Application September 13, 1938, Serial No. 229,713
In Germany September 17, 1937

6 Claims. (Cl. 88—2.3)

The present invention concerns a telescope for fixing at a distance from the same any direction by means of a plane determined by an optical member coordinated to the telescope. It had been contemplated to use a telescope of this kind in mine surveying and to dispense with optical sounding or gravity sounding at two points for the transmission of a given direction from above ground to under ground and to sound a plane by means of Nicol prisms, viz. with polarised light. This idea does not however seem to have been followed beyond this general suggestion.

According to the invention, an optical member producing a double image is placed in the ray path of the telescope, and an indicating device belonging to this member indicates the fixed plane. The optical member producing a double image is conveniently a wedge-shaped refracting prism traversed by part of the rays entering the telescope.

The indicating device is preferably a collimator or an auxiliary telescope having a collimating mark, the collimator or the auxiliary telescope being rigidly connected to the said optical member and rotatable through 180° about an axis approximately at right angles to the optical axis of the telescope, so that the differences in direction between the axis of the collimator or that of the auxiliary telescope and the plane of deviation can be eliminated. To eliminate also the refraction influences acting on the plane of deviation, it is advantageous to provide that the collimator and the optical member producing the double image and rigidly connected to this collimator are rotatable through 180° about an axis parallel to the telescope axis. The indicating device is especially advantageous if it consists of two coaxial collimators opposite to each other. This constructional form of the indicating device permits to determine the sighting direction by means of a theodolite at one and the same place by rotating this device through 180° about the axis parallel to the telescope axis.

When use is made of the telescope according to the invention, the alignment of directions is conveniently effected through the agency of a staff provided lengthwise with alternating double and single stripes, the parallel double stripes being symmetrical to the symmetry axis in the middle of the single stripes and their distance apart being greater than the breadth of the single stripes. It is convenient to provide on the staff only one single stripe which lies in the middle of the staff and extends over approximately one third of the shaft length, each of the ends of this stripe being level with the end of a double stripe. An alternative staff which is especially advantageous presents a single stripe extending over the one and a double stripe extending over the other half of its length.

In the accompanying drawings, which illustrate by way of example a telescope according to the invention, Figure 1 is a view of the telescope, Figure 2 shows, partly in a section through the telescope axis, the part constituting the indicating device, Figure 3 is the top view of the part shown by Figure 2, Figures 4 and 5 are the front and a side view, respectively, of a staff having a single stripe and two pairs of stripes, Figure 6 is a front view of a staff presenting a single stripe and a pair of stripes, Figure 7 shows the field of view of the telescope, and Figure 8 is illustrative of how the telescope is used.

In Figure 1, a telescope 1 provided with a tube level 2 and a spherical level 3 is mounted in a holding ring 4 in such a manner as to be rotatable about its axis. This telescope axis can be adjusted vertically by means of three equidistant screws 6, 7 and 8 disposed in the holding ring 4 and resting on a support 5. On the object side of the objective 9, the telescope tube bears a housing 10 which contains, as shown in Figure 2, a refracting glass wedge 13 and a direction indicating device consisting of two coaxial convergent lenses 11 and 12 whose distance apart corresponds to their focal length. These lenses 11 and 12 image at infinity marks 14 and 15, respectively, the mark 14 lying in the cemented surface of the lens 12 and the mark 15 in that of the lens 11. The ocular mounted in the upper part of the telescope 1 is referred to as 1'. The wedge 13 is disposed in the ray path in such a manner that its plane of deviation contains the axis of the telescope and the common optical axis A'—A' of the two convergent lenses 11 and 12, which is at right angles to the telescope axis B—B, the refracting edge of the glass wedge shown in Figure 2 being at right angles to the plane of the drawing and parallel to the long side of the said wedge. The convergent lenses 11 and 12 are mounted in lateral tubes 16 and 17, respectively, fast with the housing 10, the tube 16 being rotatable in a supporting plate 18 and the tube 17 in a supporting plate 19. These plates 18 and 19 have slits 20 and 21, respectively. Into the slits 20 and 21 extend bolts 22 and 23, respectively, which are fast with the telescope tube 1. The attachment of the housing 10 to the telescope tube 1 is effected by two clamps 24 and 25 or 26 and 27. The clamps 24 and 25 are diametrically fixed to the one and the clamps 26 and 27 to the other edge of the housing 10. The clamps near the objective are screwed to the telescope tube 1 by means of two tiltable bolts 28 and two nuts 29 in mesh with these bolts, only one bolt and one nut being visible in the drawings. The differences in direction between the indicating device and the plane of deviation of the wedge 13 can be eliminated by unscrewing the nuts 29, tilting the bolts 28, lowering and then rotating the housing 10 through 180° in the bearing provided by the two holding plates 18 and 19, and then fixing to the tube 1 the two clamps now near the objective 9. The rotation of the indicating device through 180° about the optical axis of the telescope for the elimination of the refraction influences acting on the plane of deviation of the wedge is effected subsequently to a loosening of the clamping screw 30 in the holding ring 4. The wedge 13 lies against the bent edge 32 fixed into the housing 10 by means of a threaded ring 31 and is held in position by another interior tube 33 and two semi-circular distance rings 34 and 35. By loosening the ring 31, the tube 32 and the wedge 13 can be withdrawn and replaced by a tube containing a wedge of greater refraction. Instead of one single wedge, use can be made of two wedges whose refracting edges are parallel to and remote from each other, the two wedges being eventually spaced by air or a plano-parallel glass plate connected to them.

Figures 4 and 5 show the front and a side view, respectively, of a staff 36 for the alignment of directions when a telescope according to Figure 1 is used, this staff being provided lengthwise in the middle with a stripe 37 which extends over one third of the entire staff length and the ends of which are level with those of double stripes 38, 39 and 38', 39', respectively. The distance apart $a$ of the double stripes is greater than the breadth $b$ of the single stripe. At the two ends of the staff, in the elongation of the middle of the single stripe 37, are provided sighting points 40 and 41, respectively, the connection line of which coincides with the symmetry axis of the staff.

Figure 6 shows a staff 42 which differs from that according to Figure 4 in that a stripe 37' extends lengthwise over the one half and two stripes 38" and 39" symmetrical thereto extend over the other half of the staff length.

Figure 7 shows the field of view in the telescope directed to a staff according to Figure 6.

Figure 8 is illustrative of how the telescope 1 is used. The telescope 1, which is mounted in a stand 44, is disposed vertically above the centre of the upper end of a shaft 43. In the lower end of this shaft, a staff 42, for instance according to Figure 6, lies horizontally on a tripod 45 in such a manner that the staff centre lies approximately in the axis of the telescope (which is conveniently provided with cross-wires) and that the line interconnecting the two sighting points 40 and 41 constitutes the direction A—A given underground. When the staff is viewed through the telescope there appear an image produced by that part of the objective 9 which is not covered by the wedge 13 and, further, an image which is parallel and displaced relatively to the first said image and is produced by the wedge 13 and that part of the objective which is covered by the wedge. The telescope is now to be rotated about its axis until the two staff images overlap each other, that is to say until the single stripe lies in the middle between the double stripe, as shown in Figure 7. As the distance apart of the two stripes constituting the double stripe is greater than the breadth of the single stripe, the distance apart of the single stripe and the two stripes of the double stripe can be made to correspond to each other very exactly. When this is the case, the plane of deviation of the wedge in the telescope contains the symmetry axis of the staff 42. The observer now aims overground by means of a theodolite at the collimator mark 14 or 15 and thus determines the horizontal direction A'—A'. To eliminate an error of direction between the collimator and the plane of deviation of the wedge, a second observation is to be effected also with another wedge position. The housing 10 is to be, accordingly, unscrewed from the telescope tube 1, rotated through 180° about the collimator axis and reattached to the telescope tube. The observer again adjusts the two images of the staff relatively to each other. The mean of the collimator directions read at the theodolite after the two measurements effected with the wedge in the one and in the other position, respectively, in which the deviating effect of the wedge takes place in one and the same direction, is, accordingly, without any error of direction. By rotating the telescope about its axis through 180° and determining the collimator direction in two positions of the wedge, the refraction influences acting on the plane of deviation can be eliminated.

We claim:

1. A device for determining a direction in a shaft, comprising a stand, a telescope mounted in said stand, said stand permitting downward sighting of said telescope, said telescope comprising an objective, an optical element connected to and disposed in the ray path of said telescope, said element deviating part of the rays entering said objective and producing together with said objective a double image, and means for indicating the direction in which said element deviates impinging rays, said means being connected to said telescope.

2. A device for determining a direction in a shaft, comprising a stand, a telescope mounted in said stand, said stand permitting downward sighting of said telescope, a refracting glass wedge inserted into part of the rays entering said telescope, the principal section of said glass wedge being parallel to the axis of said telescope, said glass wedge being rotatable through 180° about the axis of said telescope, and means for indicating the principal section of said glass wedge, said means being connected to said telescope.

3. A device for determining a direction in a shaft, comprising a stand, a telescope mounted in said stand, said stand permitting downward sighting of said telescope, said telescope comprising an objective, an optical element connected to and disposed in the ray path of said telescope, said element deviating part of the rays entering said objective and producing together with said objective a double image, said element being rotatable about the optical axis of said telescope, a lens connected to said element, the optical axis of said lens being at right angles to the axis of said telescope, a casing containing said element and said lens and detachably connected to said telescope, said casing being rotatable through 180° about the optical axis of said lens, and a mark disposed in the optical axis and at the focus of said lens.

4. A device for determining a direction in a shaft, comprising a stand, a telescope mounted in said stand, said stand permitting downward sighting of said telescope, said telescope comprising an objective, an optical element connected to and disposed in the ray path of said telescope, said element deviating part of the rays entering said objective and producing together with said objective a double image, a lens connected to said element, the optical axis of said lens being at right angles to the axis of said telescope, a casing containing said element and said lens and detachably connected to said telescope, said casing being rotatable through 180° about the optical axis of said lens and about the axis of said telescope, and a mark disposed in the optical axis and at the focus of said lens.

5. A device for determining a direction in a shaft, comprising a stand, a telescope mounted in said stand, said stand permitting downward sighting of said telescope, said telescope comprising an objective, an optical element connected to and disposed in the ray path of said telescope, said element deviating part of the rays entering said objective and producing together with said objective a double image, said element being rotatable about the optical axis of said telescope, a lens connected to said element, the optical axis of said lens being at right angles to the axis of said telescope, a casing containing said element and said lens and detachably connected to said telescope, said casing being rotatable through 180° about the optical axis of said lens, a mark disposed in the optical axis and at the focus of said lens, and another lens connected to said casing, said other lens being coaxial with first said lens and having a mark disposed in the optical axis and at the focus of said other lens, said two lenses having a distance apart corresponding to the focal length of said lenses.

6. A device for determining a direction in a shaft, comprising a stand, a telescope mounted in said stand, said stand permitting downward sighting of said telescope, said telescope comprising an objective, an optical element connected to and disposed in the ray path of said telescope, said element deviating part of the rays entering said objective and producing together with said objective a double image, a lens connected to said element, the optical axis of said lens being at right angles to the axis of said telescope, a casing containing said element and said lens and detachably connected to said telescope, said casing being rotatable through 180° about the optical axis of said lens and about the axis of said telescope, a mark disposed in the optical axis at the focus of said lens, and another lens connected to said casing, said other lens being coaxial with first said lens and having a mark disposed in the optical axis and at the focus of said other lens, said two lenses having a distance apart corresponding to the focal length of said lenses.

OTTO v. GRUBER.
WILHELM SCHNEIDER.